United States Patent [19]
Ray

[11] 3,730,559
[45] May 1, 1973

[54] TRAILER HITCHING COUPLER

[76] Inventor: James D. Ray, Route 5, Box 208, Nampa, Idaho 83651

[22] Filed: Dec. 20, 1971

[21] Appl. No.: 209,769

[52] U.S. Cl. ...................................................280/513
[51] Int. Cl. ..............................................B60d 1/06
[58] Field of Search.......................280/511, 512, 513

[56] References Cited

UNITED STATES PATENTS

| | | | |
|---|---|---|---|
| 3,492,024 | 1/1970 | Cooper | 280/513 |
| 2,237,031 | 4/1941 | Gilmore | 280/513 |
| 2,768,839 | 10/1956 | Riemann | 280/512 |
| 2,219,955 | 10/1940 | Gilmore | 280/511 |
| 3,467,409 | 9/1969 | Unter | 280/513 |

*Primary Examiner*—Leo Friaglia
*Assistant Examiner*—Robert R. Song
*Attorney*—John W. Kraft

[57] ABSTRACT

The trailer hitching coupler of this invention includes a body having a horizontally disposed body plate, a dome fastened on the lower side of the forwardmost terminal end of the body plate to operably engage a hitching ball, and a pair of parallelly upstandingly disposed cam-supporting walls fastened to the uppermost terminal side of the body plate from the rearwardmost terminal side of the dome to the rearwardmost terminal end of the body plate. The coupler also includes a cam assembly carried between the cam-supporting walls distally from the rearwardmost terminal end of the dome. The cam assembly includes an eccentric-type cam having portions of its cam axis projecting through each of the cam-supporting walls, a cam follower having a centrally disposed hole which is operable to ride about the outer circumference of the cam, and an actuator arm fastened to the outwardly projecting portions of the cam axis. The actuator arm is provided with locking means operable to lock the cam assembly when the assembly is in engagement with the hitching ball.

1 Claim, 3 Drawing Figures

PATENTED MAY 1 1973
3,730,559
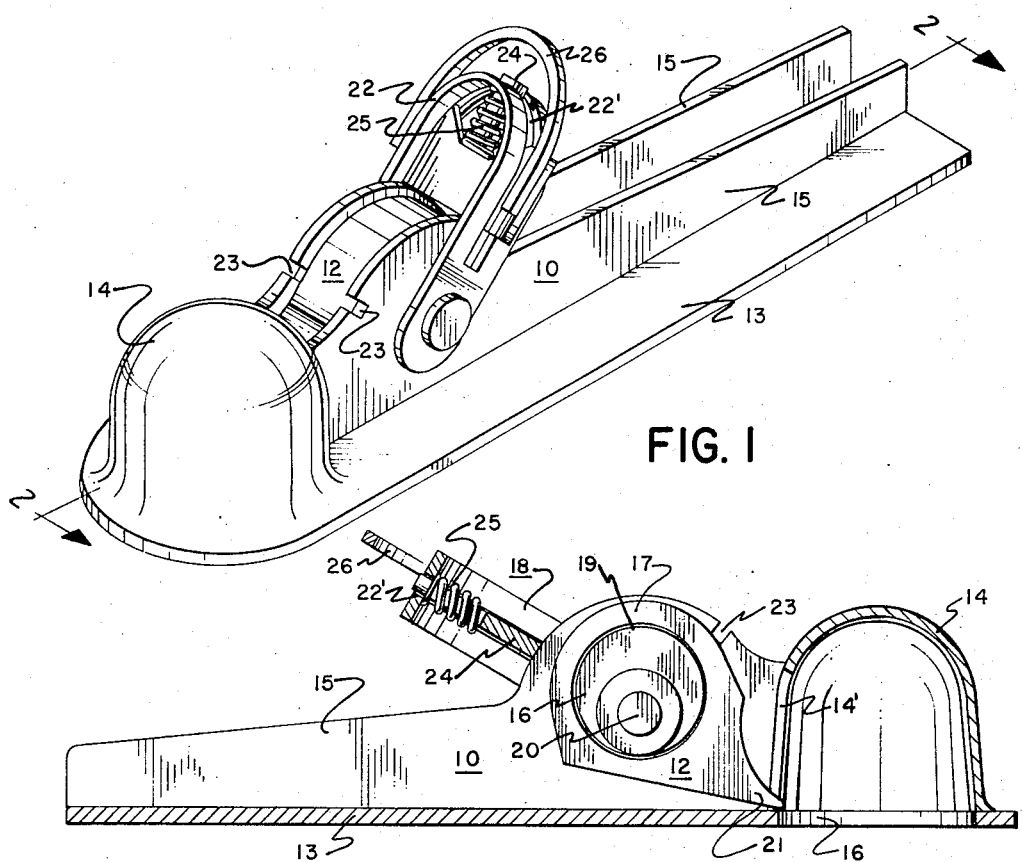
FIG. 1
FIG. 2
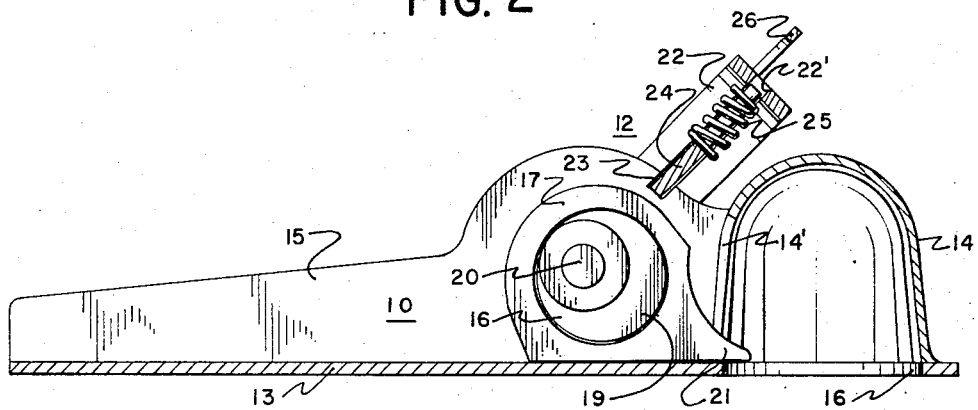
FIG. 3
JAMES D. RAY INVENTOR.
BY

TRAILER HITCHING COUPLER

1. FIELD OF INVENTION

The present invention relates to trailer hitching couplers, and more particularly to trailer hitching couplers operable to be secured to hitching ball by a cam locking means.

2. Description of the Prior Art

Means operable to lock trailer couplers to trailer hitching balls have commonly used and employed locking jaws and auxiliary chains. Locking jaws commonly are actuated by a lever means, or by threaded means. Locking jaws engage the hitching ball about its lowermost terminal portions in a vice-like configuration. Vibration and high-impact forces tend to separate the jaws, resulting in uncoupling of the trailer coupler and hitching ball. Auxiliary locking means, such as chains, are commonly fastened to the towing vehicle. Chains must be carefully fastened to the towing vehicle. Auxiliary chains may result in restricted pivoting of the coupler on the ball.

Accordingly, it is an object of the present invention to provide trailer coupler means which is operable to lockingly engage with a hitching ball by means of a positive cam-actuated locking means.

It is a further object of this invention to provide cam-actuated locking means integral with the top plate of the trailer coupler.

It is another object of this invention to provide trailer coupler locking means which must be engaged to permit the hitching of the trailer coupler to a hitching ball.

These and other objects shall become apparent from the description following, it being understood that modifications may be made without affecting the teachings of the invention here set out.

SUMMARY OF THE INVENTION

Generally, the trailer hitching coupler of this invention includes a body having a horizontally disposed body plate, a dome fastened on the lower side of the forwardmost terminal end of the body plate to operably engage a hitching ball, and a pair of parallelly upstandingly disposed cam-supporting walls fastened to the uppermost terminal side of the body plate from the rearwardmost terminal side of the dome to the rearwardmost terminal end of the body plate. The coupler also includes a cam assembly carried between the cam-supporting walls distally from the rearwardmost terminal end of the dome. The cam assembly includes an eccentric-type cam having portions of its cam axis projecting through each of the cam-supporting walls, a cam follower having a centrally disposed hole which is operable to ride about the outer circumference of the cam, and an actuator arm fastened to the outwardly projecting portions of the cam axis. The actuator arm is provided with locking means operable to lock the cam assembly when the assembly is in engagement with the hitching ball.

A more thorough and comprehensive understanding may be had from the detailed description of the preferred embodiment when read in connection with the drawings forming a part of this specification.

BRIEF DESCRIPTION OF THE DRAWINGS

FIG. 1 is a right front perspective view of the trailer hitching coupler of this invention.

FIG. 2 is a cross-sectional view taken substantially along the lines 2—2 of the FIG. 1, showing the cam lock in the open receiving position.

FIG. 3 is a cross-sectional view taken substantially along the lines 2—2 of the FIG. 1, showing the cam lock in its closed locked position.

DETAILED DESCRIPTION OF THE PREFERRED EMBODIMENT:

Referring now to the drawings, and more particularly to the FIG. 1, the trailer hitching coupler of this invention is shown to advantage and identified by the numeral 10. The coupler 10 comprises a body 11 and a cam assembly 12. The body 11 includes a body plate 13, a coupler dome 14, and a pair of cam-supporting walls 15. The body plate 13 is a horizontally disposed plate having an elongated configuration with respect to its rectilinear axis. The coupler dome 14 is a domed portion fastened to the uppermost terminal side of the forwardmost terminal end of the body plate 13. The dome 14 is distally larger than the outside configuration of a trailer hitching ball (not shown). A ball receiving hole 16 is provided in the body plate 13 under the interior walls of the dome 14, as shown in the FIG. 2. Referring again to the FIG. 1, a pair of parallelly disposed cam-supporting upstanding walls 15 are fastened rectilinearly to the uppermost terminal side of the body plate 13 between the rearwardmost terminal side of the dome 14 and the rearwardmost terminal end of the plate 13. It has been found to advantage to generally taper the uppermost terminal edges of the walls 15 downwardly from their forwardmost terminal ends to their rearwardmost terminal ends. It is to be understood that the cam-supporting walls 15 provide a housing for the cam assembly 12 and rectilinear support for the body plate 13.

The cam assembly 12 is carried between the walls 15. The cam assembly 12 comprises a cam 16, a cam follower 17, and an actuator arm assembly 18. As shown by the FIG. 2, the cam 16 is an eccentric cam in which the cam portion 19 has a circular configuration and in which the cam axis 20 has a different center than the cam portion 19. The cam axis 20 comprises a portion which projects from each of the terminal sides of the cam 16 and which rides in suitable holes in the forward portions of the cam-supporting walls 15. The follower 17 has a centrally disposed hole which rides about the outer circumference of the cam portion 19. The forwardmost terminal end of the cam follower 17 has a locking shoe portion 21 which is operable as a hitching ball locking means. The lowermost terminal side of the cam follower 17 has a substantially straight configuration which is operable to be adjacently disposed to the uppermost terminal side of the walls 15 when the cam assembly 12 is in the locked position. The forward upper portion of the cam follower 17 has a curved concave configuration similar to the outer configuration of a hitching ball. The dome 14 is provided on its rearwardmost side with an entranceway 14' operable to receive the locking shoe portion of the cam follower 17 and to engage the forwardmost portions of the locking shoe 21 with the hitching ball.

The cam assembly 12 is actuated by an actuator arm assembly 18. The actuator arm assembly 18 includes a substantially U-shaped actuator arm 22. The terminal ends of the actuator arm 22 are fastened to the outwardly projecting portions of the cam axis 20. The actuator arm assembly 18 is fastened to the cam 16 such that the widest portion of the cam 16 will be disposed upwardly with respect to the coupler 10, when the actuator arm assembly 18 is at its rearwardmost position, and such that the cam 16 will be disposed forwardly and downwardly when the actuator arm assembly 18 is in its forwardmost position. It has been found to advantage to include actuator arm locking means, such as a pair of locking notches 23, disposed in the uppermost terminal edges of each of the cam-supporting walls 15 in a position corresponding to the forwardmost travel of the actuator arm assembly 18, and to include a locking knife 24 disposed rectilinearly in the actuator arm 22 to slidably engage the notch 23. The locking knife 24 is disposed in a slot 22' provided in the upper terminal portions of the actuator arm 22, as shown more clearly in the FIG. 1. The knife 24 is urged toward the walls 15 by means of an urging spring 25 disposed between the lowermost side of the base of the U-shaped arm 22 and the uppermost side of the locking knife 24. The knife 24 may be drawn out of the locking notches 23 by means of a handle 26 fastened to the outer terminal sides of the knife 24, the handle projecting from the arm 22 through the slots 22'. It has been found to advantage to provide a convexly curved upper terminal edge to the forward portions of the walls 15 to provide a housing for the cam assembly 12 in its open position and to guide the locking knife 24 in its travel.

In operation, the hitching coupler 10 may be prepared to receive a hitching ball by disengaging the locking knife 24 from the locking notch 23 and rotating the actuator arm assembly 18 rearwardly with respect to the coupler 10. This motion causes the cam 16 to cam the cam follower 17 in an upward direction and to permit the locking shoe portion 21 to move rearwardly along the body plate 13, as shown by the FIG. 2. The cam assembly 12 may be locked into its closed position by rotating the actuator arm assembly 18 forwardly until the locking knife 24 engages the locking notch 23, until the locking shoe 21 projects through the entranceway 14' of the dome 14, and until the lowermost straight terminal side of the cam follower 17 is disposed adjacent to the uppermost terminal side of the plate 13.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A trailer hitching coupler, comprising
a body including a horizontally disposed body plate,
a dome fastened to the uppermost terminal side of the forwardmost terminal end of said body plate, said dome being operable to engage a hitching ball, and a pair of parallelly upstandingly disposed cam-supporting walls fastened to the uppermost terminal side of said body plate from the rearwardmost terminal side of said dome to the rearwardmost terminal end of said body plate; and
a cam assembly carried between said cam-supporting arms distally from the rearwardmost terminal side of said dome, said cam assembly including an eccentric-type cam having portions of its cam axis projecting through each of said cam-supporting walls, a cam follower having a centrally disposed hole which is operable to ride about the outer circumference of said cam, said follower having a straight sided lower terminal portion and a forwardly projecting shoe portion having a concavely configured upper terminal side operable to conformingly engage said hitching ball, said dome having a suitable entranceway in its rearwardmost terminal side to permit said forwardmost terminal side of said follower to project into said dome, said cam assembly including an actuator arm operable to rotate said cam on its cam axis, said actuator arm being fastened at each of the terminal sides of said outwardly projecting cam axis, said actuator arm including locking means operable to lock said cam assembly when said assembly is in engagement with said hitching ball, said locking means including a pair of notches disposed at each of said cam-supporting walls in a position corresponding to the forwardmost travel of said actuator arm and a spring-loaded locking knife carried in said actuator arm, said locking knife being operable to engage said locking notches.

* * * * *